United States Patent [19]

Noe

[11] Patent Number: 4,781,955
[45] Date of Patent: Nov. 1, 1988

[54] RIBBON BLOWN GLASS ARTICLE

[75] Inventor: Raymond J. Noe, Highland Heights, Ohio

[73] Assignee: General Electric Company, Schenectady, N.Y.

[21] Appl. No.: 12,107

[22] Filed: Feb. 6, 1987

Related U.S. Application Data

[63] Continuation-in-part of Ser. No. 739,487, May 30, 1985, abandoned, which is a continuation of Ser. No. 519,436, Aug. 1, 1983, abandoned.

[51] Int. Cl.⁴ .............................................. H01K 1/00
[52] U.S. Cl. .................................. 428/35; 220/2.1 R; 313/113; 313/116; 313/117; 313/634; 362/347; 362/349; 362/350; 362/363
[58] Field of Search ................. 428/35; 65/67, 69, 70, 65/71; 220/2.1 R; 313/113, 116, 117, 634; 362/363, 347, 349, 350

[56] References Cited

U.S. PATENT DOCUMENTS

| | | | |
|---|---|---|---|
| 3,372,826 | 3/1968 | Heaton | 65/105 |
| 3,694,178 | 12/1969 | Hennequin | 65/84 |
| 3,716,136 | 2/1973 | Birner et al. | 209/82 |
| 3,729,301 | 4/1973 | Heaton et al. | 65/81 |
| 3,729,302 | 4/1973 | Heaton | 65/105 |
| 3,792,988 | 2/1974 | Nowak et al. | 65/79 |
| 4,569,867 | 2/1986 | Noe | 428/35 |
| 4,571,252 | 2/1986 | Noe | 65/82 |
| 4,572,730 | 2/1986 | Noe | 65/67 |

Primary Examiner—Ellis P. Robinson
Assistant Examiner—P. R. Schwartz
Attorney, Agent, or Firm—Edward M. Corcoran; John P. McMahon; Fred Jacob

[57] ABSTRACT

A method and apparatus is disclosed to produce a blown glass envelope on a ribbon machine having a self supporting closed end, said article being of a unitary, integral construction with glass wall thickness substantially less than that found in conventional pressed glass envelope. Said ribbon formed glass envelope has a cylindrical neck portion terminating at one end in a bulb portion of larger cross sectional dimensions and which includes the self supporting base end. The sides of said glass envelope can be curved or flat and with said self supporting base also being of a curved or planar contour. A novel mold construction permitting said glass envelope to be blown on a ribbon machine comprises a pair of cooperative halves forming the sides of the blown glass envelope in a central cavity in which further includes a separate base part located at the lower end of the said cavity to shape the self supporting base, said base part of the mold being provided with reciprocal motion in a vertical direction.

14 Claims, 2 Drawing Sheets

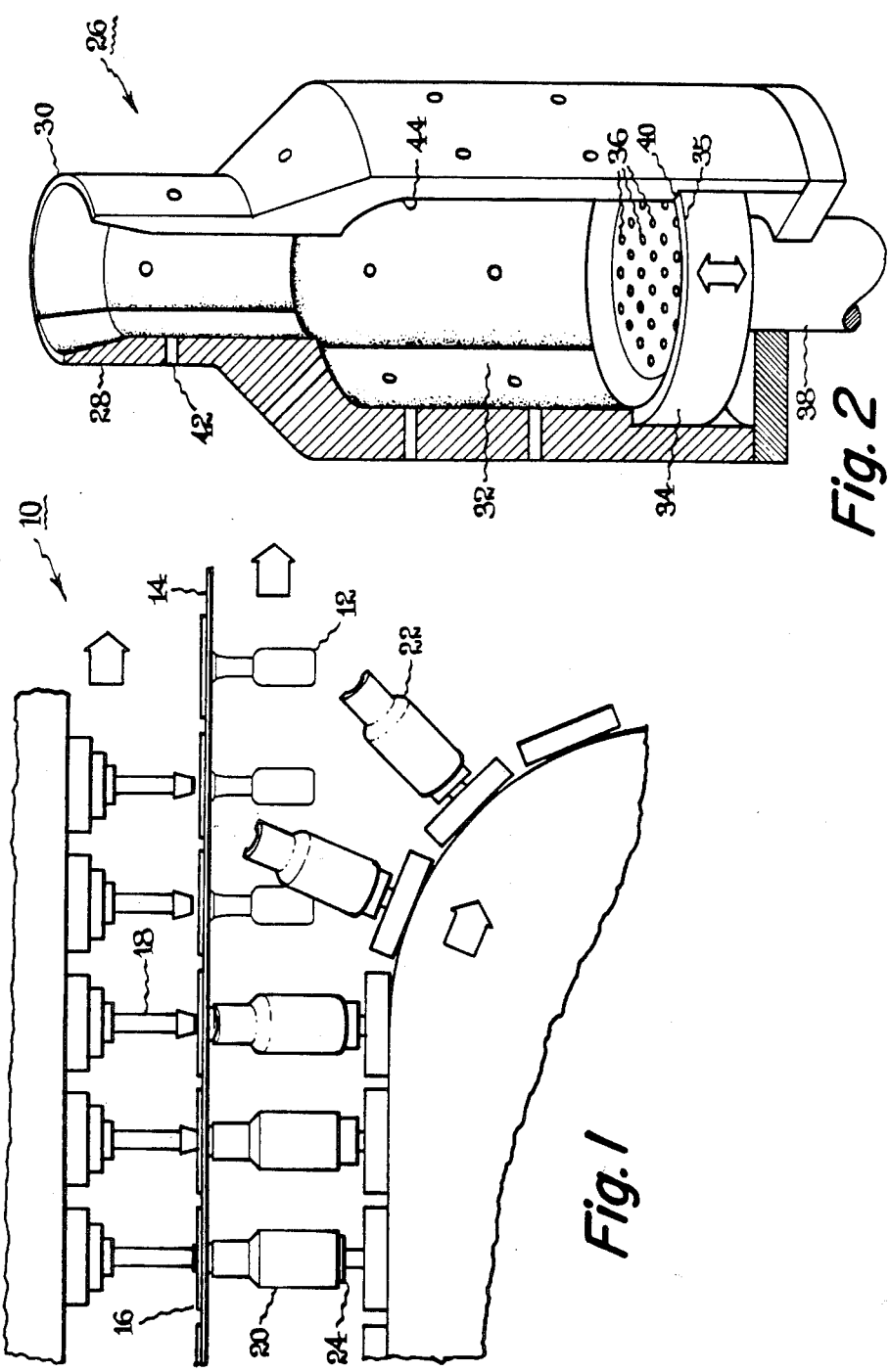

RIBBON BLOWN GLASS ARTICLE

CROSS-REFERENCE TO RELATED APPLICATIONS

This application is a Continuation-in-Part application of copending application Ser. No. 739,487, abandoned, filed on May 30, 1985 which, in turn is a Continuation application under 37 CFR 1.62 of now-abandoned Ser. No. 519,436, abandoned, filed on Aug. 1, 1983.

BACKGROUND OF THE INVENTION

In the manufacture of hollow glassware having flat bottoms and/or relatively flat face portions, articles of simple form, such as culinary glassware, are usually shaped by simply pressing a parison of melted glass between a matrix and a die. However, when the shape becomes hollower and more complex, it is necessary to operate in at least two stages. In the "pressed-blown" process, a rough is first formed by pressing, then the final form is obtained by blowing in a finishing mold; this process makes it possible to obtain objects with a rather large neck, such as industrial vessels. For the manufacture of flasks or bottles, one ordinarily has recourse to the "blown-blown" process wherein the parison is injected into a mold in which it is formed into a prerough by formation of the ring at the lower part, the orifice constituting an entry for blowing. The mold is then completed by a base mold, and the prerough is transformed into a rough by blowing in the roughing mold thus constituted. The rough is turned over, suspended by its ring and finished to a final form by a second blowing in a finishing mold. This requires the use of thick glass, causes alignment problems and results in the formation of a visible seam.

These processes all form glass articles in a slow, progressive fashion with the so-formed articles having relatively thick wall thicknesses of at least about 100 mils and more often at least about 125 mils. For many applications, these relatively heavy wall thicknesses are unnecessary resulting in a high cost of manufacture due to both the thickness of the glass and relative slowness of the process.

A significant improvement in the act has been the development of the ribbon process. Ribbon blown glass envelopes have been traditionally formed on a ribbon machine with two-part molds having a partible construction and which rotate while encircling a hollow molten glass blank. Said conventional glass molds have been generally provided with a paste coating of the central mold cavity along with vent openings to form a steam cushion against which the glass envelope is blown while said mold halves are rotating. Although the bulb portion of a glass envelope blown in the conventional manner has included cylindrical as well as conical and spherical shapes, all of these shapes have terminated at the closed end of the bulb portion in a spherical contour preventing the blown article from physically supporting itself. Accordingly, such limitation has retarded any wider utilization of conventional ribbon blown glass envelopes in a variety of end product applications including liquid containers and even lamp glass envelopes requiring a relatively flat face portion to serve as a lens member in the lamps.

The present invention relates to novel means whereby glass articles of various types are blown on a ribbon machine in a novel mold construction which shapes the closed end of the glass envelope to provide a self-supporting base contour wherein all structural features of said articles are a unitary, integral construction and wherein the wall thickness thereof is substantially less than that found in conventional pressed glass articles. More particularly, said novel mold construction includes three basic parts which cooperate in forming a bulb shape terminating in a flattened contour sufficient to permit the glass envelope to be self supporting, that is to stand alone without additional physical support. The basic mold design of the present invention includes a pair of cooperative partible halves forming the sides of the blown glass envelope in a central cavity and which further includes a separate base part located at the lower end of said cavity to shape the closed end of said blown glass envelope into the desired self-supporting contour, said base part of the mold being provided with reciprocal motion in a vertical direction.

Accordingly, an important object of the present invention is to provide a ribbon blown glass envelope of a unitary, integral construction having assorted shapes for various end product applications wherein the bulb portion of said envelope terminates in a self-supporting contour and wherein the wall thickness of the envelope is substantially less than that found in conventional pressed glass envelopes.

Another important object of the present invention is to provide ribbon blown glass envelopes having either curved or planar sides together with an integral self-supporting base contour which can also be planar or curved in shape.

Still another important object of the present invention is to provide an improved method for manufacutre of said novel glass envelope on a ribbon machine by means of a novel mold design.

SUMMARY OF THE INVENTION

In accordance with the present invention, there is provided a ribbon formed glass envelope of a unitary, integral construction with a wall thickness substantially less than that found in conventional pressed glass envelopes and having a cylindrical neck portion terminating at one end in a closed bulb portion of larger cross-sectional dimensions and which includes a self-supporting base contour. In various preferred embodiments, the glass envelope is blown from either molten hard or soft glass compositions of a conventional type and with said self-supporting base end being either a flat plane or defined by the intersection of two or more flat planes. Alternately, the self-supporting base contour of said blown glass envelope can be a curved surface having either a convex or concave shape with respect to the sides of said glass envelope, but of such limited curvature that said envelope physically supports itself when resting on its base end. The sides of the present blown glass envelope can also be planar or curved in shape with the planar sided glass envelopes requiring that the mold halves understandably not rotate while the glass envelope is being formed.

The basic method of the present invention continuously forms a blown glass envelope of a unitary, integral construction having a self-supporting closed end and having a wall thickness substantially less than that found in conventional pressed glass envelopes from a molten ribbon of glass supported on a moving conveyor by means of:

(a) blowing a portion of the glass from said molten ribbon into the central cavity of a multi-part mold, said mold including a pair of cooperative halves forming the sides of said blown glass envelope by encircling the molten glass while being blown and which mold further includes a separate base part located at the lower end of said cavity to form the self-supporting terminal end of said blown glass envelope, said base part of the mold being provided with reciprocal motion in a vertical direction;

(b) having the base part of said mold move upwardly and remain in an upward position while the glass envelope is being blown, but then moved downwardly and release the glass envelope before the mold halves are opened;

(c) opening the mold halves to release the sides of the solidified blown glass envelope, and (d) severing the blown glass envelope from he moving glass ribbon.

The glass envelopes formed according to the process of this invention will have a wall thickness below about 90 mils which will generally range between about 15 to 80 mils and preferably 15 to 25 mils. These wall thicknesses are substantially below the wall thicknesses of conventionally blown and pressed glass envelopes which are in excess of 100 mils.

In a preferred form of said method for manufacutre of a glass envelope having symmetrical curved sides, the mold halves include means to form a steam cushion against which the glass envelope is blown, such as the already known ventilated paste type mold, and with said mold halves being rotated during formation of the glass envelope. In said preferred method, the base part of the mold also includes vent openings to help ventilate the central cavity, but generally does not require a paste coating to form a suitable self-supporting base end for the blown glass envelope.

In a preferred method of forming glass envelopes having planar sides according to the present invention, both mold halves and the base part remain stationary with respect to each other while the glass envelope is being blown. The mold parts are also entirely devoid of a paste coating or ventilation means despite providing a self-supporting base end on the blown glass envelope which can either be planar or curved.

It is further possible to provide blown glass envelopes according to said preferred embodiment from conventional hard glass compositions as well as soft glass compositions, although soft glass would generally be selected for most end product applications involving ordinary temperature service.

BRIEF DESCRIPTION OF THE DRAWINGS

FIG. 1 illustrates a fragmentary side elevation view of an exemplary glass ribbon machine embodying the present invention.

FIG. 2 is a perspective view illustrating a simplified mold design according to the present invention.

DESCRIPTION OF PREFERRED EMBODIMENTS

Figure 4:
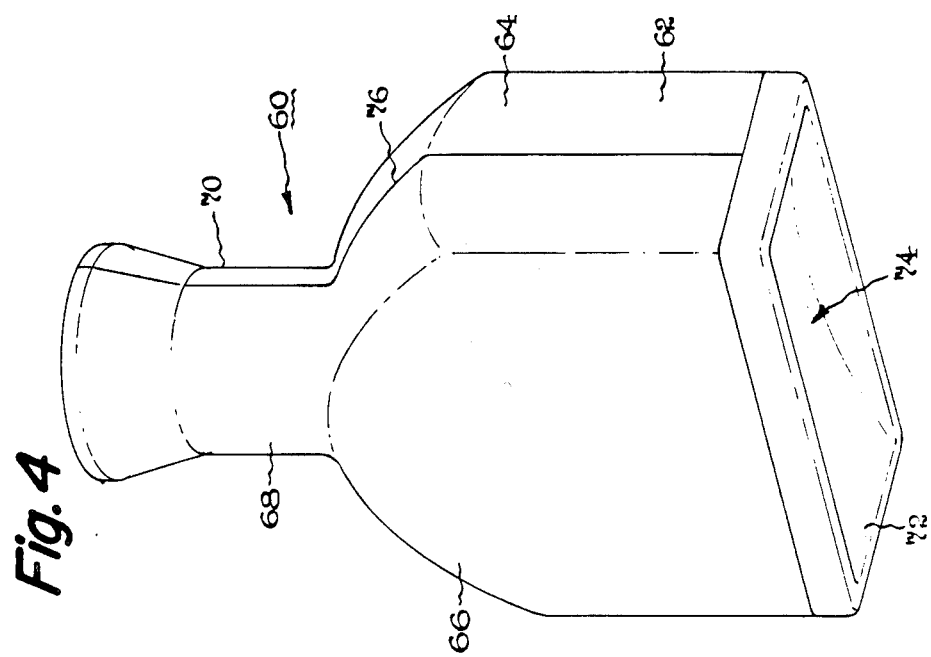
FIG. 4 is a perspective view illustrating a different type glass envelope formed according to the present invention.

Referring to FIG. 1, there is partially depicted a conventional hot ribbon machine 10 which forms the presently improved glass envelope 12 from a molten ribbon of glass 14 that is being carried on a moving conveyor having interconnected orifice plates 16. The molten glass is blown downwardly by blowheads 18 into the central cavity portions of glass molds 20 constructed in accordance with the present invention. The mold halves 22 are closed while a cylindrically shaped glass envelope is being blown while the separate base portion 24 of each mold is moved upwardly and retained in the upward position during this step of the manufacturing poocess. Downward movement of said base part in the molds is automatically carried out on said ribbon machine by conventional means after the molten glass has solidified in the mold cavitites as a necessary step before said mold halves are opened. Rotation of the mold halves 22 which is carried out when the glass envelopes are formed in this manner as well as severing the blown glass envelopes from the moving glass ribbon after the mold halves have been opened are all carried out in the customary manner now being utilized in ribbon machine manufacture.

A simplified mold construction 26 incorporating the essential structural features required to form the above described blown glass article is depicted in FIG. 2. Specifically, a pair of mold halves 28 and 30 cooperate to form the side portions of the cylindrical blown glass envelope in a central cavity 32 which terminates in a separate flat base part 34 of circular contour 35. Vent openings 36 are provided on the upper bare metal surface of said flat base part as an optional means to help ventilate the mold cavity. Said base part 34 is also provided with reciprocal motion in a vertical direction by means of being mounted on the bearing surface 38 and with said upward motion being limited by physical contact with a rim surface 40 machined at the lower end of the cooperating mold halves. In said mold construction, the cooperating mold halves are rotated in the customary manner to form the cylindrical glass envelope and with said mold halves further having vent openings 42 along with a paste coating 44 being applied to the inner surface of the central mold cavity.

Figure 3:
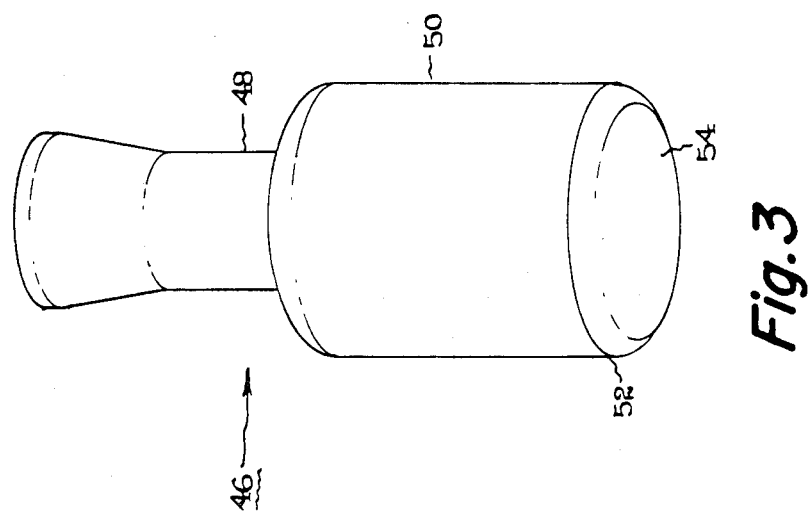
FIG. 3 is a perspective view illustrating one type of glass envelope formed in accordance witht he present invention.

In FIG. 3 there is depicted a perspective view of a representative glass envelope formed as above described and which can be utilized as a liquid container. Said blown glass article 46 includes a cylindrical neck portion 48 terminating at one end in a bulb portion of larger cross sectional dimensions 50 which includes a self-supporting closed end 52 of planar configuration 54. As can be observed, the sides and base portions of the blown glass article are all of relatively uniform thickness as well as devoid of any physical mold seams.

FIG. 4 is a perspective view of a different blown glass article 60 having a straight sided configuration 62 formed by intersection of a pair of opposing and parallel flat planes 64 and 66. Said glass article further includes a cylindrical neck portion 68 and 70 terminating in a straight sided bulb portion of larger cross sectional dimensions and with the bulb portion of said glass article ending in a self-supporting base 72 of convex curvature 74. As can be observed from the drawing, however, a visible mold seam 76 is produced in said glass article due to non rotation of the mold halves during the glass forming operation.

While preferred embodiments of the present invention along with improved methods for manufacturing said embodiments have been shown and described, various other embodiments along with modifications in the described method of manufacture will become apparent to persons skilled in the art without departing from the true spirit and scope of the present invention. For example, it would be apparent from the foregoing description that various combinations of planar and curved sides can be employed for the bulb portion of the blown glass envelope as well as in the self-supporting base end of said envelope. Accordingly, the scope of the present invention is limited only to the following claims:

What is claimed is:

1. A ribbon blown glass article of a unitary, integral construction with a wall thickness less than about 90 mils which is less than that found in conventional blown and pressed glass articles, said ribbon blown glass article having a cylindrical neck portion terminating at one end in a bulb portion of larger cross-sectional dimensions and which includes a self-supporting closed end, wherein all structural features in said blown glass article are fully formed in a single metal mold of multi-part construction by having a pair of mold halves which rotate to provide curved sides in said glass article but which do not rotate when providing planar sides in said glass article, and which multi-part mold further includes a non-rotating base part that provides a self supporting closed end of either convex or flat contour in both curved sides and planar sides types of said glass article by moving upwardly in place while said glass article is being blown in said mold halves, but which then moves downwardly and releases said glass article before the mold halves are opened.

2. A glass article as in claim 1 wherein said self-supporting closed end is defined by the intersection of two or more flat planes.

3. A glass article as in claim 1 having flat planar sides.

4. A glass article as in claim 1 having curved sides.

5. A glass article as in claim 1 having sloping sides.

6. A glass article as in claim 5 having conical sides.

7. A glass article as in claim 1 having cylindrical sides.

8. A glass article as in claim 1 having curved sides and a self-supporting base which is a curved surface having a lesser degree of curvature than said sides.

9. A glass article as in claim 1 formed with hard glass.

10. A glass article as in claim 1 formed with soft glass.

11. A glass article as in claim 10 having a wall thickness between about 15 mils to 80 mils.

12. A glass article as in claim 11 having a wall thickness between about 15 to 25 mils.

13. A glass article as in claim 12 wherein said self-supporting closed end is defined by the intersection of two or more flat planes.

14. A glass article as in claim 11 wherein said self-supporting closed end is defined by the intersection of two or more flat planes.

* * * * *